March 24, 1931. E. J. WITCHGER 1,797,279
MEASURING GAUGE KIT
Filed Sept. 20, 1928
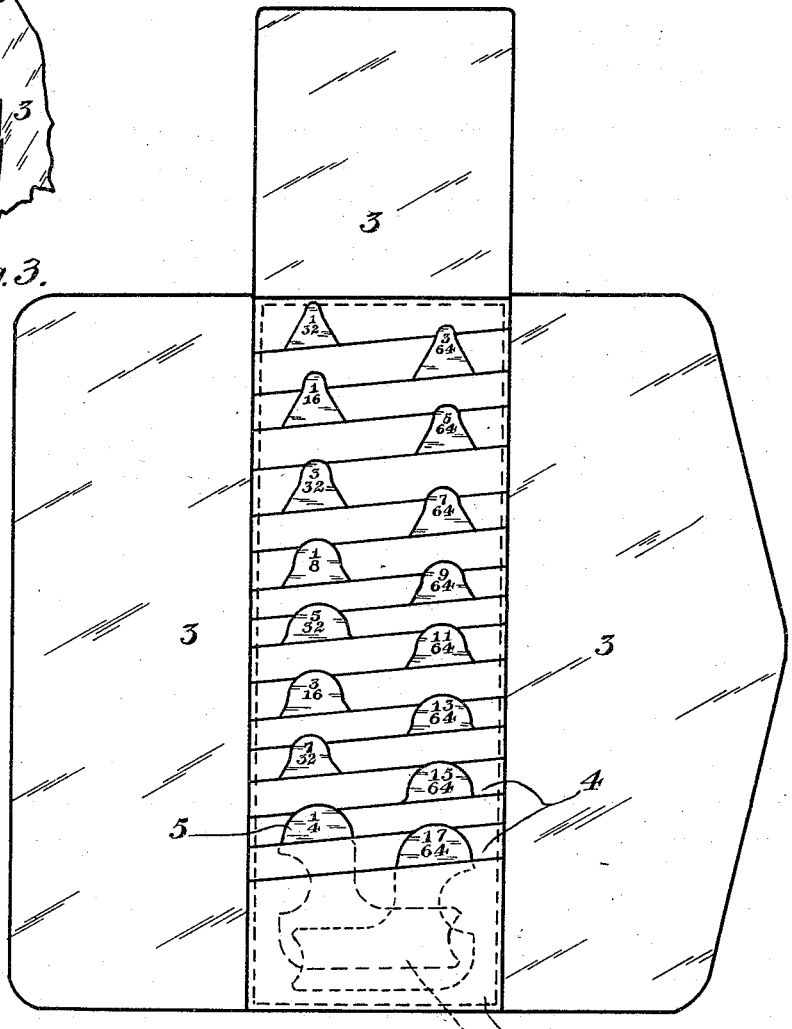
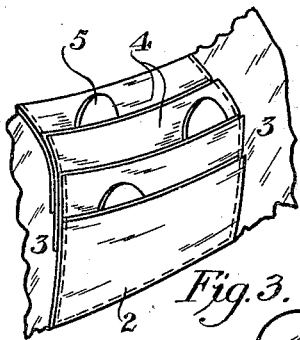
INVENTOR
EUGENE J. WITCHGER
BY
ATTORNEY Patented Mar. 24, 1931

1,797,279

UNITED STATES PATENT OFFICE

EUGENE J. WITCHGER, OF SAGINAW, MICHIGAN, ASSIGNOR TO LUFKIN RULE COMPANY, OF SAGINAW, MICHIGAN, A CORPORATION OF MICHIGAN

MEASURING-GAUGE KIT

Application filed September 20, 1928. Serial No. 307,142.

This invention is a measuring gauge kit and the invention as claimed herein is embodied in the combination of a group of unattached independently usable gauges with a container having structural characteristics by which certain important results are secured in the selecting, handling and using of end gauges.

This association of independent gauges and their characteristic container is believed to be new and is obviously useful.

Prior practice has been to mount end gauges in a container shaped like the handle of a pocket knife, there being a pivot pin through the handle at each end, a number of gauges being strung blade-like thereon so as to fold within the handle or to spread out in fan-like formation therefrom when opened. With these prior gauge sets or kits more or less difficulty was encountered in selecting from the number of pivotally mounted gauge blades on the handle the one of required size. Also there was always the liability of getting the blades mixed, the result being that the wrong one might present itself during the ordinary handling of the tool while in use, notwithstanding the right one was selected in the beginning.

An object of my invention is to expedite the selection and application of the correct gauge to the work to be measured by making each gauge as a separate individual unit or tool and identifying it by means of a distinctive index character or dimension, preferably impressed on both sides of an end portion thereof, or in any other location so as to be readily exposed to view and differentiated from all the others.

The invention further facilitates this desirable result by mounting all of the gauges in a container which in its more generic aspect is characterized by having a body member, in the form of a flexible enevelope, and made with a plurality of overlapping pockets. These pockets are of appropriate size and shape to receive and conceal from view all of each gauge except the area or tip upon which is impressed the index character, such as one-sixteenth inch, seven sixty-fourths inch, etc. The container is also provided with a suitable closure in the form of a lid or an enveloping or covering flap.

A proper and patentable co-operation exists between the independent L-shaped gauges of the present invention and the multiple pocketed container in which the gauges are carried in staggered, offset, overlapped or eschelon arrangement for ready identification and for individual removal of a selected gauge.

Further advantages of the invention are incorporated in a preferred and more or less specific flexible structure for the container and in its co-operation with the gauges, these advantages being greater convenience of insertion and removal of the gauges in the container, neatness, compactness, lightness and a suitable degree of flexible yielding to make the kit comfortable to carry in the pocket.

With the foregoing and certain other objects in view, which will appear later in the specification, my invention comprises the devices described and claimed and the equivalents thereof.

In the drawings Fig. 1 is a face view of a preferred form of the invention, with flexible container.

Fig. 2 is a side view of one of the gauges.

Fig. 3 is a fragmentary perspective view showing the container of Fig. 1 flexed backward to facilitate removal and insertion of the gauges.

As is clearly shown in the drawings, the device consists in a plurality of end gauges preferably of substantially L-shape as shown in Fig. 2, each comprising a thin plate whose various marginal edges are formed to present a number of gauging elements 1, 1a, 1b, 1c, 1d of predetermined shape and proportions.

These gauging elements have their intended uses in machining or other operations, where the work requires accurate gauging of beads, circular or otherwise, in cross sectional shape, or of filets, projections or the like. The sizes of the individual gauges progressively increase by a definite unit of measurement, such as one sixty-fourth inch, between limits which define the working range of the kit. For example, a given set or kit for measuring cylindrical objects may contain sixteen gauges, say, from one thirty-second inch radius for the smallest to seventeen sixty-fourths inch for the largest, each piece having a number of working or gauging elements, preferably all of a size and capable of conveniently fitting into filets, or of fitting around beads wherever they may happen to be located on the work.

The individual gauging elements on each gauge are all of the same general contour and size, but the different gauges possess working or gauge elements of different sizes. Each gauge plate bears an identifying index character near one of its ends, as shown in Fig. 2.

All of the gauges of a group or set are removably received in a container shown in its preferred form in Fig. 1, that comprises a body member 2, provided with a suitable cover 3. The body member is also formed with a plurality of pockets 4 that conceal most of the gauge, but leave exposed to view an area or tip 5 thereof which bears the identifying mark previously mentioned. The assembled arrangement of gauges and container is such that the tips are displayed in substantially staggered formation, the bodies of the gauge plates being in overlapped relation within adjacent pockets as shown by dotted lines at 6 in Fig. 1.

By this arrangement the greater part of each gauge, being concealed in its pocket, is protected from oxidation and kept clean and bright and its working edges are secured against accidental injury that might affect their correctness and accuracy.

The individual gauges being preferably L-shape can be placed in the pockets or slits of the container so their tips will present two rows or columns of index characters, one of the rows advancing, say, one sixty-fourth inch, the other one-sixteenth inch, thereby facilitating the selection of a gauge of any particular size.

In the specific form shown in Fig. 1 the otherwise flexible container is stiffened and strengthened by the overlapping arrangement of the gauges in the successive pockets as shown by dotted lines at 6. In Fig. 3 the flexible body 2 of the container is capable of being bent backwards to make the tips 5 more readily accessible when removing or replacing the individual gauges in pockets 4.

By the means above described my invention avoids the necessity, heretofore present, of selecting from a number of over-lapping pivoted blades, spread out in fan-like form, the end of the individual gauge which is required for the immediate work.

The combination above described is especially convenient for the use of machinists and artisans whose work requires the gauging of beads, grooves, filets and the like where it is especially important that the liability of mistakes in measurement be reduced to a minimum.

Having thus described my invention, what I claim and desire to secure by Letters Patent is:

1. In combination, a plurality of end gauge plates and a container for the same that comprises a flat body member of flexible material formed with a plurality of successively overlapping pockets each adapted to receive a pair of gauges leaving exposed an area or tip of each gauge, the arrangement of the overlapping pockets being such that the bodies of the gauges within adjacent pockets are overlapped on each other to constitute a stiffening means for said flexible container.

2. A plurality of end gauges whose various marginal edges are formed to present a number of gauging elements of predetermined shape and proportions, each gauge being removably received in a container that comprises a flexible body member having a plurality of pockets that conceal most of said gauge but leave exposed to view an area or tip thereof bearing an identifying mark, the assembled arrangement being such that the tips are displayed in substantially staggered arrangement and the bodies of the gauge plates within adjacent pockets are in overlapped arrangement, thereby imparting strength and stiffness to the container.

3. In combination, a plurality of end gauges each comprising a thin plate of substantially L-shape whose various marginal edges are formed to present a number of gauging elements of predetermined shape and proportions, each gauge plate being removably received in a container that comprises a body member formed with a plurality of pockets that conceal most of said gauge but leave exposed to view an area or tip thereof bearing an identifying mark, the assembled arrangement being such that the tips are displayed in substantially staggered formation, the bodies of the gauge plates being in overlapped relation within adjacent pockets.

In testimony whereof, I affix my signature.

EUGENE J. WITCHGER.